(12) United States Patent
Pabst et al.

(10) Patent No.: US 8,957,555 B2
(45) Date of Patent: Feb. 17, 2015

(54) WIND TURBINE ROTARY ELECTRIC MACHINE

(75) Inventors: Otto Pabst, Rio di Pusteria (IT); Matteo Casazza, Val di Vizze (IT)

(73) Assignee: Wilic S.AR.L., Luxembourg (LU)

( * ) Notice: Subject to any disclaimer, the term of this patent is extended or adjusted under 35 U.S.C. 154(b) by 229 days.

(21) Appl. No.: 13/416,129

(22) Filed: Mar. 9, 2012

(65) Prior Publication Data

US 2013/0062975 A1 Mar. 14, 2013

(30) Foreign Application Priority Data

Mar. 10, 2011 (IT) .............................. MI2011A0378

(51) Int. Cl.
| | |
|---|---|
| *H02K 9/00* | (2006.01) |
| *H02K 1/27* | (2006.01) |
| *F03D 9/00* | (2006.01) |
| *H02K 1/32* | (2006.01) |
| *H02K 5/18* | (2006.01) |
| *H02K 5/20* | (2006.01) |
| *H02K 7/18* | (2006.01) |

(52) U.S. Cl.
CPC .............. *H02K 1/2773* (2013.01); *F03D 9/002* (2013.01); *H02K 1/32* (2013.01); *H02K 5/18* (2013.01); *H02K 5/20* (2013.01); *F05B 2220/7066* (2013.01); *H02K 1/2786* (2013.01); *H02K 7/1838* (2013.01); *Y02E 10/725* (2013.01)
USPC ................. 310/59; 310/216.069; 310/156.55; 310/156.59; 310/156.16; 310/156.22

(58) Field of Classification Search
CPC ....... H02K 1/278; H02K 1/2773; H02K 1/32; H02K 5/18; F05B 2220/7066

USPC .................. 310/59, 216.069, 156.55, 156.59, 310/156.16, 156.22
See application file for complete search history.

(56) References Cited

U.S. PATENT DOCUMENTS

| | | | |
|---|---|---|---|
| 1,894,357 | A | 1/1933 | Manikowske et al. |
| 1,948,854 | A | 2/1934 | Heath |
| 1,979,813 | A | 11/1934 | Reis |
| 2,006,172 | A | 6/1935 | Klappauf |
| 2,040,218 | A | 5/1936 | Soderberg |
| 2,177,801 | A | 10/1939 | Erren |
| 2,469,734 | A | 5/1949 | Ledwith |
| 2,496,897 | A | 2/1950 | Strickland |
| 2,655,611 | A | 10/1953 | Sherman |
| 2,739,253 | A | 3/1956 | Plumb |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Translation of foreign document DE 102009025929 (Year: 2010).*

(Continued)

*Primary Examiner* — Alex W Mok
(74) *Attorney, Agent, or Firm* — Neal, Gerber & Eisenberg LLP

(57) ABSTRACT

A wind turbine rotary electric machine having a tubular body, in turn having a cylindrical wall; and a plurality of clips formed integrally with the cylindrical wall and configured so that each pair of facing clips defines a seat for housing an active sector.

29 Claims, 3 Drawing Sheets

(56) References Cited

U.S. PATENT DOCUMENTS

| | | |
|---|---|---|
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,445,062 A | 4/1984 | Glaser |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,175,177 B1 * | 1/2001 | Sabinski et al. .......... 310/156.55 |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B1 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |

(56) References Cited

U.S. PATENT DOCUMENTS

| | | |
|---|---|---|
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,932,574 B2 | 8/2005 | Wobben |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,078,841 B2 * | 7/2006 | Yokota .......................... 310/153 |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Siegfriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,687,932 B2 | 3/2010 | Casazza et al. |
| 7,768,168 B2 * | 8/2010 | Aschoff et al. .......... 310/156.22 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0209949 A1 * | 11/2003 | Uemura .................. 310/156.12 |
| 2003/0230899 A1 | 12/2003 | Martinez |
| 2004/0066098 A1 | 4/2004 | Doherty et al. |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152014 A1 * | 7/2006 | Grant et al. .................. 290/55 |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0188036 A1 * | 8/2007 | Shibukawa .................. 310/113 |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0015091 A1 * | 1/2009 | Yang et al. ............... 310/156.09 |
| 2009/0045628 A1 | 2/2009 | Erdman et al. |
| 2009/0060748 A1 | 3/2009 | Landa et al. |
| 2009/0079285 A1 * | 3/2009 | Koumura ................ 310/156.16 |
| 2009/0094981 A1 | 4/2009 | Eggleston |
| 2009/0096309 A1 | 4/2009 | Pabst et al. |
| 2009/0243301 A1 * | 10/2009 | Longtin et al. ................ 290/55 |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |

(56) References Cited

U.S. PATENT DOCUMENTS

| | | | |
|---|---|---|---|
| 2010/0123318 A1 | 5/2010 | Casazza et al. | |
| 2010/0194220 A1* | 8/2010 | Tatematsu et al. | 310/61 |
| 2010/0277028 A1* | 11/2010 | Alexander et al. | 310/156.51 |
| 2010/0289386 A1* | 11/2010 | Gerstler et al. | 310/60 A |
| 2011/0001320 A1* | 1/2011 | Lagerweij et al. | 290/55 |
| 2011/0187218 A1* | 8/2011 | Kaessner et al. | 310/156.01 |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4436290 | 5/1996 |
| DE | 4444757 | 6/1996 |
| DE | 4445899 | 6/1996 |
| DE | 19501267 | 8/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19826086 | 12/1999 |
| DE | 19846924 | 4/2000 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 102007042338 | 3/2009 |
| DE | 102009025929 | 12/2010 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1425840 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 2063117 | 5/2005 |
| EP | 1568883 | 8/2005 |
| EP | 1589222 | 10/2005 |
| EP | 1612415 | 1/2006 |
| EP | 1641102 | 3/2006 |
| EP | 1792381 | 3/2006 |
| EP | 1677002 | 7/2006 |
| EP | 1772624 | 4/2007 |
| EP | 1780409 | 5/2007 |
| EP | 1788241 | 5/2007 |
| EP | 1829762 | 9/2007 |
| EP | 1881194 | 1/2008 |
| EP | 1921311 | 5/2008 |
| EP | 2102496 | 7/2008 |
| EP | 2060786 | 5/2009 |
| EP | 2063115 | 5/2009 |
| EP | 2063116 | 5/2009 |
| EP | 2143842 | 1/2010 |
| EP | 2143938 | 1/2010 |
| EP | 2143944 | 1/2010 |
| EP | 2 282 397 | 2/2011 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2613148 | 3/1988 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 56081053 | 7/1981 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9607825 | 3/1996 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0014405 | 3/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |

(56) References Cited

FOREIGN PATENT DOCUMENTS

| WO | WO03036084 | 5/2003 |
|---|---|---|
| WO | WO03067081 | 8/2003 |
| WO | WO03076801 | 9/2003 |
| WO | WO2004017497 | 2/2004 |
| WO | WO2004042227 | 5/2004 |
| WO | WO2004044419 | 5/2004 |
| WO | WO2005050008 | 6/2005 |
| WO | WO2005103489 | 11/2005 |
| WO | WO2006013722 | 2/2006 |
| WO | WO2006032515 | 3/2006 |
| WO | WO 2007063370 | 6/2007 |
| WO | WO2007063370 | 6/2007 |
| WO | WO2007110718 | 10/2007 |
| WO | WO2008052562 | 5/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Maxime R. Dubous, Henk Polinder, Study of TFPM Machines with Toothed Rotor Applied to Direct-Drive Generators for Wind Turbines, 2004.

Variable Speed Gearless Wind Turbine (website), http://www.mhi.cojp/msmw/mw/en/gearless.html, viewed on Sep. 22, 2006.

International Search Report for Italian Application No. MI20110378 dated Jan. 23, 2012.

* cited by examiner

WIND TURBINE ROTARY ELECTRIC MACHINE

PRIORITY CLAIM

This application claims the benefit of and priority to Italian Patent Application No. MI2011A 000378, filed on Mar. 10, 2011, the entire contents of which are incorporated by reference herein.

BACKGROUND

A wind turbine segmented rotary electric machine of the type described in PCT Patent Application No. WO 2006/032969 A2 normally has a large diameter, and comprises a stator, and a rotor mounted to rotate with respect to the stator about a designated or given axis. The rotor and stator each have a tubular body, and a plurality of active sectors fixed to the tubular body, and are positioned to keep their respective active sectors facing and separated by an air gap, so that, in use, the respective magnetic forces interact to generate electric energy.

The tubular bodies are normally mounted on the top end of the wind turbine, and the active sectors fitted to the tubular bodies later.

Some maintenance operations also call for dismantling, reassembling, and sometimes changing the active sectors.

SUMMARY

The present disclosure relates to a wind turbine rotary electric machine.

More specifically, one embodiment of the present disclosure relates to a segmented rotary electric machine. The present disclosure provides a rotary electric machine which is easy to produce and, when installed on a wind turbine, permits easy assembly and disassembly of the active sectors.

According to one embodiment of the present disclosure, there is provided a wind turbine rotary electric machine comprising a tubular body, which extends about a designated or given axis and comprises a cylindrical wall; and a plurality of clips parallel to the designated or given axis, formed integrally with the cylindrical wall, and configured so that each pair of facing clips defines a seat for housing an active sector.

It should be appreciated that for the purpose of the present disclosure, when two elements of the tubular body are referred to as being formed integrally, such two elements are not glued, welded, bolted, jointed or otherwise attached, but rather form one seamless body of material. More specifically, the clips and the cylindrical wall form one body.

By virtue of the present disclosure, the clips need not be fitted to the cylindrical wall to form the active sector seats, and no alternative fastening techniques, such as gluing, are required to fasten the active sectors.

Moreover, forming the clips and the cylindrical wall in one piece reduces induction of the electric machine magnetomotive force harmonics on the tubular body, thus reducing parasitic current flow in the tubular body and electromagnetic losses, and enhancing the efficiency of the wind turbine. Reducing electromagnetic losses also greatly reduces overheating of the tubular body.

In one embodiment of the present disclosure, each pair of clips is configured to exert elastic grip on the active sector. In this embodiment, elastic grip has the advantage of holding the active sector in a designated or given position, with no need for fasteners, such as bolts, nuts or adhesive, applied directly to the active sector.

In one embodiment of the present disclosure, each clip comprises a base portion adjacent to the cylindrical wall; and an end portion configured to grip the active sector, so as to define a channel between each pair of clips, the active sector, and the cylindrical wall. In this embodiment, the channel so formed has two functions: in actual service, the channel may be used to conduct cooling fluid; and, when assembling or disassembling the active sector, the channel allows insertion of a retractor to part the two clips elastically, to insert or remove the active sector easily.

In one embodiment of the present disclosure, the end portion has ridges and grooves making the end portion complementary in shape to part of the active sector. In this embodiment, the ridges, grooves, and complementary shape of the end portion ensure the active sector is gripped firmly and so held firmly in position with respect to the clips and the cylindrical wall.

In one embodiment, the pairs of clips are separated by gaps sized to allow each pair of clips to part sufficiently to insert and extract the active sector, so all the active sectors can be inserted and extracted with no interference or friction.

In one embodiment of the present disclosure, the clips extend axially to a length shorter than the cylindrical wall.

A portion of the cylindrical wall may be used to cooperate with brakes, rotation speed sensors, etc.

In one embodiment of the present disclosure, the tubular body comprises a further cylindrical wall formed integrally with the cylindrical wall and configured to support a bearing. The cylindrical wall supporting the bearing and the cylindrical wall supporting the active sectors are formed in one piece to minimize assembly of the tubular body.

More specifically, the further cylindrical wall is smaller in diameter than the cylindrical wall; and the tubular body comprises an annular wall connecting and formed integrally with the cylindrical wall and the further cylindrical wall.

The tubular body advantageously comprises a flange for connecting the tubular body to a hub supporting the blades of the wind turbine; the flange being adjacent to and formed integrally with the further cylindrical wall.

The transmission between the blades and the rotor is thus simplified, rigid, and relatively faster to assemble.

More specifically, the tubular body is formed in one piece, and performs a number of functions otherwise performed by specific component parts.

In one embodiment, the tubular body is cast.

In one embodiment, the tubular body is made of non-magnetic material to reduce magnetic and, therefore, heat losses.

In one such embodiment, the tubular body is made of aluminum or aluminum alloy. Of non-magnetic materials, aluminum, in addition to being non-magnetic, includes the additional characteristics of being light weight, mechanically strong, heat conductive and workable, all of which are important characteristics in the manufacture of large-size wind turbine rotors. For example, the tubular body is over 1.5 meters (4.92 feet) in diameter.

In one embodiment of the present disclosure, the tubular body comprises a plurality of cooling fins formed integrally with the cylindrical wall and, in one such embodiment, located on the opposite side of the cylindrical wall to the clips.

The tubular body can thus be cooled effectively, with no need to assemble the cooling fins.

In one embodiment of the present disclosure, the tubular body has further cooling fins formed integrally with the clips.

In another embodiment of the present disclosure, the tubular body comprises a plurality of through holes for conducting cooling fluid, and which, in one such embodiment, extend through the cylindrical wall to connect a space between each pair of clips with a space on the opposite side of the cylindrical wall.

The tubular body thus forms an integral part of the cooling circuit.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
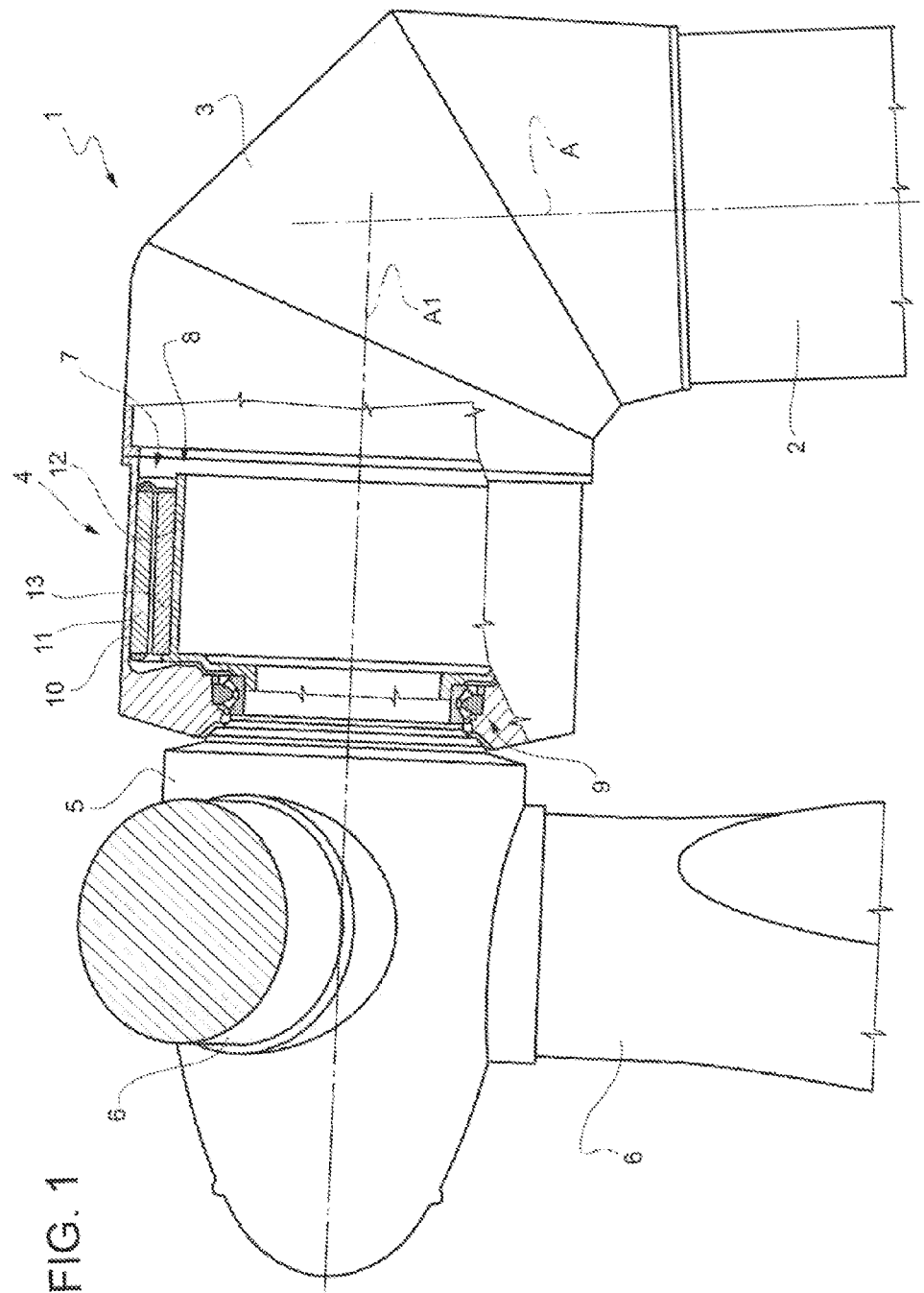
FIG. 1 shows a partly sectioned side view, with parts removed for clarity, of a wind turbine comprising an electric machine in accordance with the present disclosure.
Figure 2:
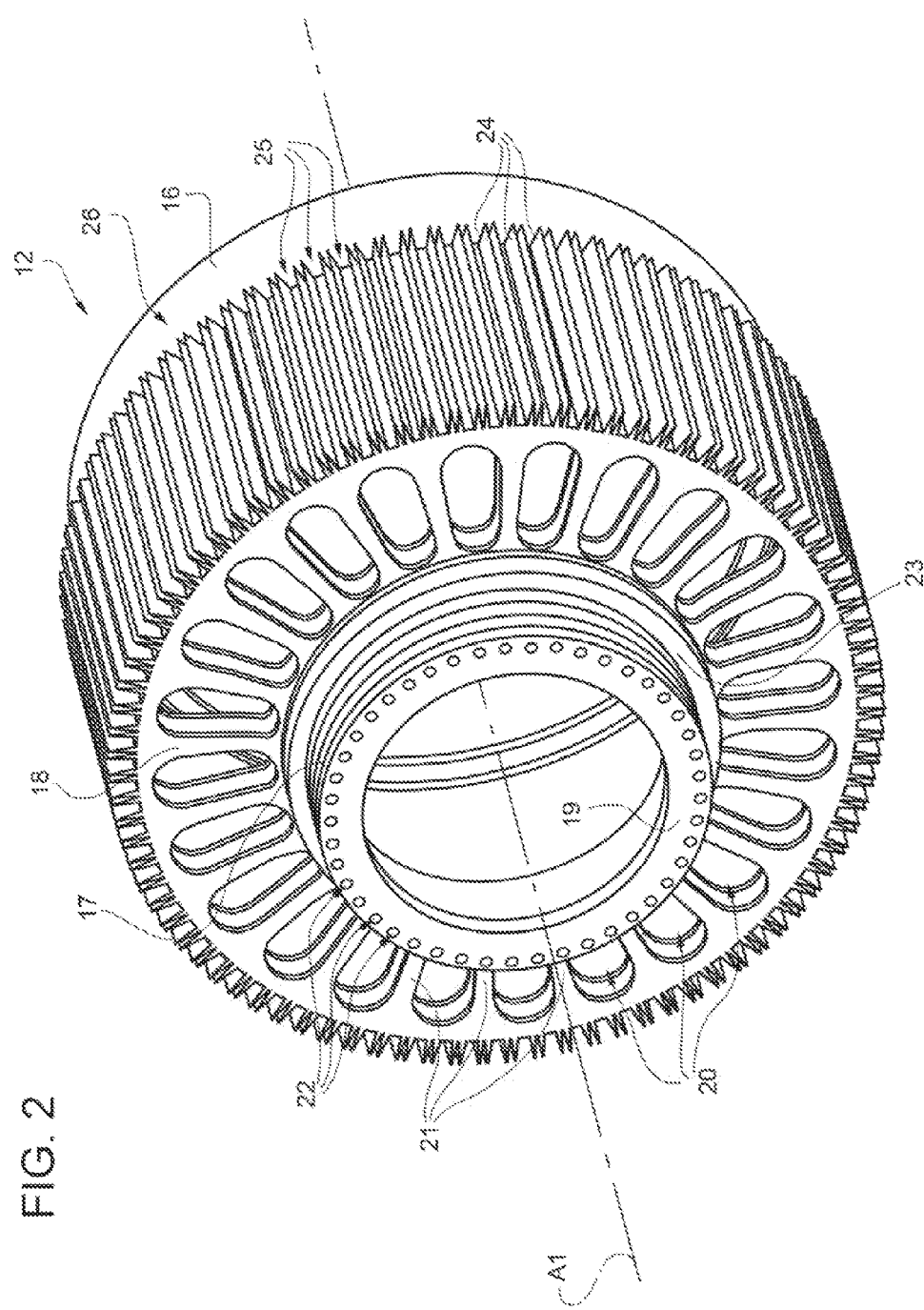
FIG. 2 shows a partly sectioned view in perspective, with parts removed for clarity, of a tubular body of the electric machine according to the present disclosure.
Figure 3:
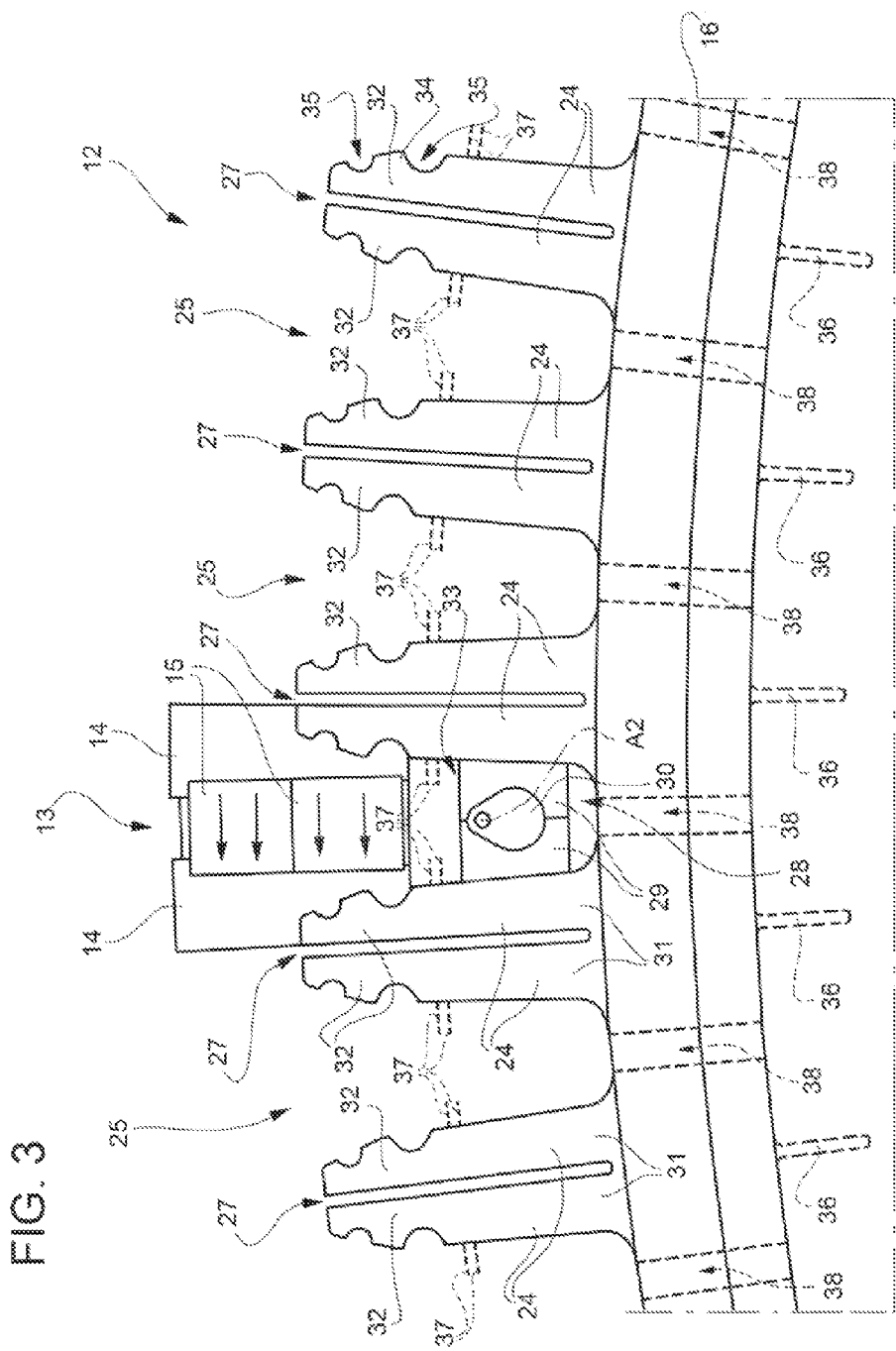
FIG. 3 shows a larger-scale front view, with parts removed for clarity, of a detail of the FIG. 2 tubular body.

Referring now to the example embodiments of the present disclosure illustrated in FIGS. 1 to 3, number 1 in FIG. 1 indicates as a whole a wind turbine for producing electric energy, and which comprises a supporting structure 2, a nacelle 3, a rotary electric machine 4, a hub 5, and three blades 6 (only two shown in FIG. 1). Nacelle 3 is mounted to rotate with respect to supporting structure 2 about an axis A, and hub 5 to rotate with respect to nacelle 3 about an axis A1. Rotary electric machine 4 comprises a stator 7 partly defining nacelle 3, or rather the outer shell of nacelle 3; and a rotor 8 connected rigidly to hub 5. And a bearing 9 is located between stator 7 and rotor 8—in the example shown, one bearing 9 close to the connection of rotor 8 to hub 5.

Stator 7 comprises a tubular body 10, and a plurality of active stator sectors 11 arranged about axis A1 and fitted to tubular body 10; and rotor 8 comprises a tubular body 12, and a plurality of active rotor sectors 13 arranged about axis A1 and fitted to tubular body 12.

Active sectors 11 and 13 extend parallel to axis A1, are positioned facing and separated by an air gap, and are insertable and removable axially with respect to tubular bodies 10 and 12. In the example shown, rotary electric machine 4 is a synchronous, permanent-magnet type; each active stator sector 11 is defined by a magnetic guide coupled to a coil (not shown in the drawings); and each active rotor sector 13 is defined by two magnetic guides 14 coupled to permanent magnets 15 as shown in FIG. 3.

As shown in FIG. 2, tubular body 12 comprises a cylindrical wall 16; a cylindrical wall 17 smaller in diameter than cylindrical wall 16; an annular wall 18 connecting cylindrical walls 16 and 17; and a flange 19 adjacent to cylindrical wall 17. Annular wall 18 has a plurality of radial openings 20 equally spaced about axis A1 to form a plurality of radial arms 21 in wall 18. Flange 19 has a plurality of holes 22 for fasteners by which to fix tubular body 12 to hub 5 (FIG. 1). Cylindrical wall 17 defines the seat for bearing 9 shown in FIG. 1, and is bounded axially by flange 19 and by an annular shoulder 23 adjacent to wall 18. Cylindrical wall 16 is configured to house active rotor sectors 13 (FIG. 3), and accordingly has a plurality of clips 24 defining a plurality of seats 25 for a plurality of active sectors 13 (FIG. 3). Each clip 24 is formed integrally with cylindrical wall 16 (i.e., cylindrical wall 16 and clips 24 form a single body). More specifically, each clip 24 extends radially with respect to axis A1, and parallel to axis A1 to a length shorter than the axial length of wall 16, which, on the opposite side to annular wall 18, has a portion 26 with no clips 24.

As shown in FIG. 3, each seat 25 for an active sector 13 extends between a pair of facing clips 24. The pairs of facing clips 24 defining respective seats 25 are separated by axial gaps 27 sized to allow pairs of clips 24 to flex circumferentially, to insert and extract active sectors 13 into and from respective seats 25, and to spring back into position to grip active sectors 13. More specifically, each pair of grips 24 is parted elastically by a retractor 28 comprising two elongated members 29; and a cam 30 located between elongated members 29, and which rotates about a longitudinal axis A2. Rotation of cam 30 about axis A2 from a rest position parts elongated members 29, which in turn part clips 24 on which they rest. Using retractor 28, clips 24 can be parted slightly along their whole length.

Alternatively, or in conjunction with retractor 28, clips 24 may be heated differentially to part them thermally.

Each clip 24 comprises a base portion 31 adjacent to cylindrical wall 16; and an end portion 32 configured to grip active sector 13, so as to define a channel 33 between each pair of clips 24, active sector 13, and cylindrical wall 16. In other words, active sector 13 only occupies part, and projects partly outwards, of seat 25. Channel 33 performs two functions: channel 33 allows insertion of retractor 28 when inserting or extracting active sector 13; and, in actual service, channel 33 allows cooling fluid flow, even in direct contact with a row of permanent magnets 15.

Each end portion 32 has ridges 34 and grooves 35 complementary in shape to active sector 13, so as to define a precise position of active sector 13 with respect to clips 24 and wall 16.

As shown by dash lines in FIG. 3, parallel cooling fins 36 project from cylindrical wall 16 to increase the heat exchange surface of tubular body 12, and are formed integrally with cylindrical wall 16 and the whole of tubular body 12.

In another embodiment shown by dash lines in FIG. 3, tubular body 12 comprises further cooling fins 37 housed inside channels 33, and which project from and are formed integrally with clips 24.

In another embodiment shown by dash lines in FIG. 3, tubular body 12 comprises a plurality of through holes 38 for conducting cooling fluid. In the example shown, through holes 38 extend through cylindrical wall 16 to connect channels 33 to the space inside cylindrical wall 16, form an integral part of a cooling circuit, and serve to conduct cooling fluid—in this case, air—to channels 33.

With reference to FIG. 2, in one embodiment, tubular body 12 is formed and cast in one piece (i.e., cylindrical walls 16 and 17, annular wall 18, flange 19, and clips 24 form one body).

In one embodiment, tubular body 12 is made of non-magnetic material, which has the additional advantages, in service, of reducing magnetic and thermal losses, and, when inserting and removing active sectors 13, of preventing tubular body 12 from interacting with active sectors 13 comprising permanent magnets 15.

At present, the non-magnetic materials for tubular body 12 are aluminum and aluminum alloys, which, besides being non-magnetic, have good mechanical strength, and are lightweight and easy to work.

Other non-magnetic materials particularly suitable for this type of application are titanium, non-magnetic steel and polymers.

In another embodiment (not shown in the drawings), the clips may be solid with substantially no circumferential elasticity; in which case, the sectors are inserted at the ends and clamped by other clamping devices.

It should be appreciated that though the rotary electric machine in the example shown in the drawings is a tubular type with the rotor inside the stator, the present disclosure also applies to electric generators with the rotor surrounding the stator.

It should be further appreciated that in the above description, the term 'cylindrical wall' is intended to refer to a substantially annular wall and not necessarily circular wall.

Clearly, changes may be made to the present disclosure without, however, departing from the protective scope as defined in the accompanying Claims. That is, the present disclosure also covers embodiments not described herein and equivalent embodiments, which nevertheless fall within the protective scope of the accompanying Claims. It should thus be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wind turbine rotary electric machine comprising:
   a rotor including a tubular body which extends about an axis, said tubular body including:
      a first cylindrical wall, and
      a plurality of clips parallel to the axis and formed integrally with the first cylindrical wall, wherein:
         (i) each pair of facing clips defines a seat configured to at least partly house an active sector including a magnetic guide and a quantity of magnets,
         (ii) each pair of facing clips is configured to exert elastic grip on the at least partly housed active sector of said pair of facing clips to form a channel between said pair of facing clips, said active sector, and a portion of the first cylindrical wall, and
         (iii) the pairs of facing clips are separated by a plurality of axial gaps defined by the first cylindrical wall and the plurality of clips, said axial gaps are sized to allow the pair of facing clips to flex circumferentially and elastically part by an amount to allow the insertion and removal of the active sector of said pair of facing clips.

2. The wind turbine rotary electric machine of claim 1, wherein each clip of each pair of facing clips includes:
   a base portion adjacent to the first cylindrical wall, and
   an end portion configured to grip the active sector at least partly housed by said pair of facing clips.

3. The wind turbine rotary electric machine of claim 2, wherein the end portion has ridges and grooves to define a shape which is complementary in shape to a part of the active sector.

4. The wind turbine rotary electric machine of claim 1, wherein the clips extend axially to a length shorter than the first cylindrical wall to define a portion of the first cylindrical wall with no clips.

5. The wind turbine rotary electric machine of claim 1, wherein the tubular body includes a second cylindrical wall formed integrally with the first cylindrical wall and configured to support a bearing.

6. The wind turbine rotary electric machine of claim 5, wherein the second cylindrical wall is smaller in diameter than the first cylindrical wall and the tubular body includes an annular wall connecting and formed integrally with the first cylindrical wall and the second cylindrical wall.

7. The wind turbine rotary electric machine of claim 5, wherein the tubular body includes a flange configured to connect the tubular body to a hub supporting a plurality of blades of a wind turbine, the flange being adjacent to and formed integrally with the second cylindrical wall.

8. The wind turbine rotary electric machine of claim 1, wherein the first cylindrical wall and the clips are formed in one body.

9. The wind turbine rotary electric machine of claim 1, wherein the tubular body is cast.

10. The wind turbine rotary electric machine of claim 1, wherein the tubular body is made of non-magnetic material.

11. The wind turbine rotary electric machine of claim 1, wherein the tubular body is made from a material selected from the group consisting of: aluminium and aluminium alloy.

12. The wind turbine rotary electric machine of claim 1, wherein the tubular body is greater than 1.5 meters in diameter.

13. The wind turbine rotary electric machine of claim 1, wherein the rotor includes a plurality of active sectors housed in said seats.

14. The wind turbine rotary electric machine of claim 1, wherein the tubular body includes a plurality of cooling fins formed integrally with the first cylindrical wall.

15. The wind turbine rotary electric machine of claim 14, wherein the cooling fins are located on the opposite side of the first cylindrical wall to said clips.

16. The wind turbine rotary electric machine of claim 14, wherein the cooling fins project from the clips.

17. The wind turbine rotary electric machine of claim 1, wherein the tubular body defines a plurality of through holes configured to conduct cooling fluid.

18. The wind turbine rotary electric machine of claim 17, wherein the through holes extend through the first cylindrical wall to connect a defined space between each pair of clips to a defined space on the opposite side of the first cylindrical wall to the clips.

19. The wind turbine rotary electric machine of claim 1, which includes a hub and a plurality of blades fitted to the hub, wherein said tubular body is connected directly to the hub.

20. The wind turbine rotary electric machine of claim 1, wherein the wind turbine rotary electric machine includes a synchronous permanent magnet rotary electric machine.

21. A wind turbine comprising:
   a hub;
   a plurality of blades fitted to the hub; and
   a rotor connected directly to the hub and configured to rotate about an axis, said rotor including:
      a tubular body which extends about the axis, said tubular body including:
         a first cylindrical wall, and
         a plurality of elastic clips parallel to the axis and formed integrally with the first cylindrical wall, wherein each pair of facing elastic clips at least partially defines: (i) a seat configured to at least partly house an active sector, and (ii) an axial cooling channel,
      wherein said tubular body defines at least one through hole configured to conduct a cooling fluid from the axial cooling channel through the first cylindrical wall.

22. The wind turbine of claim 21, wherein each clip includes:

a base portion adjacent to the first cylindrical wall, and an end portion configured to grip the active sector, wherein each pair of facing elastic clips, the active sector, and a portion of the first cylindrical wall define the axial cooling channel.

23. The wind turbine of claim 21, wherein the tubular body includes a second cylindrical wall formed integrally with the first cylindrical wall and configured to support a bearing.

24. The wind turbine of claim 23, wherein the second cylindrical wall is smaller in diameter than the first cylindrical wall and the tubular body includes an annular wall connecting and formed integrally with the first cylindrical wall and the second cylindrical wall.

25. The wind turbine of claim 21, wherein the first cylindrical wall and the clips are formed in one body.

26. The wind turbine of claim 21, wherein the tubular body is made of non-magnetic material.

27. The wind turbine of claim 21, wherein the tubular body includes a plurality of cooling fins formed integrally with the first cylindrical wall.

28. A wind turbine rotary electric machine comprising:
a rotor configured to rotate about an axis, said rotor including:
a tubular body which extends about the axis, said tubular body including:
an outer rotor wall, and
a plurality of clips formed integrally with at least a portion of the outer rotor wall, wherein a pair of facing clips defines a seat configured to at least partly house an active sector including a magnetic guide and a quantity of magnets, the pair of facing clips is configured to exert elastic grip on the active sector and the pair of facing clips is elastically deformable to flex circumferentially, and
a plurality of axial channels, each axial channel defined by one of the pairs of facing clips, the active sector at least partly housed in the seat defined by the pair of facing clips and the portion of the outer rotor wall.

29. The wind turbine rotary electric machine of claim 28, wherein the wind turbine rotary electric machine includes a synchronous permanent magnet rotary electric machine.

\* \* \* \* \*